United States Patent [19]

Jacobs

[11] 4,025,085
[45] May 24, 1977

[54] SWAY STABILIZER FOR TRAILING VEHICLES

[76] Inventor: James Paul Jacobs, Rte. 1-Box 310, Port Lavaca, Tex. 77979

[22] Filed: Dec. 31, 1975

[21] Appl. No.: 645,647

[52] U.S. Cl. .............................................. 280/446 B
[51] Int. Cl.² ........................................... B62D 53/00
[58] Field of Search ........ 280/406 A, 446 R, 446 B

[56] References Cited
UNITED STATES PATENTS

| | | | |
|---|---|---|---|
| 2,124,043 | 7/1938 | Smith | 280/446 R |
| 2,493,874 | 1/1950 | Hume | 280/406 A |
| 2,940,776 | 6/1960 | Curtis | 280/446 B |
| 3,058,548 | 10/1962 | Stair | 280/446 R X |
| 3,400,948 | 9/1968 | Matson | 280/432 X |
| 3,512,803 | 5/1970 | Hines | 280/432 |
| 3,733,090 | 5/1973 | Keller | 280/432 |
| 3,801,133 | 4/1974 | Thompson | 280/406 A |

Primary Examiner—Joseph F. Peters, Jr.
Assistant Examiner—R. Schrecengost
Attorney, Agent, or Firm—William F. Frank

[57] ABSTRACT

A sway stabilizer for trailing vehicles which comprises a camming assembly to be attached to the towing vehicle and a tensioned lever assembly which is to be attached to the trailing vehicle and which cooperates with the camming assembly. There is also provided an additional embodiment having solenoid actuated means which cooperate with the camming assembly to limit the angle which can be made between the axis of the trailing vehicle and the towing vehicle to prevent jack-knifing of the trailing vehicle.

15 Claims, 8 Drawing Figures

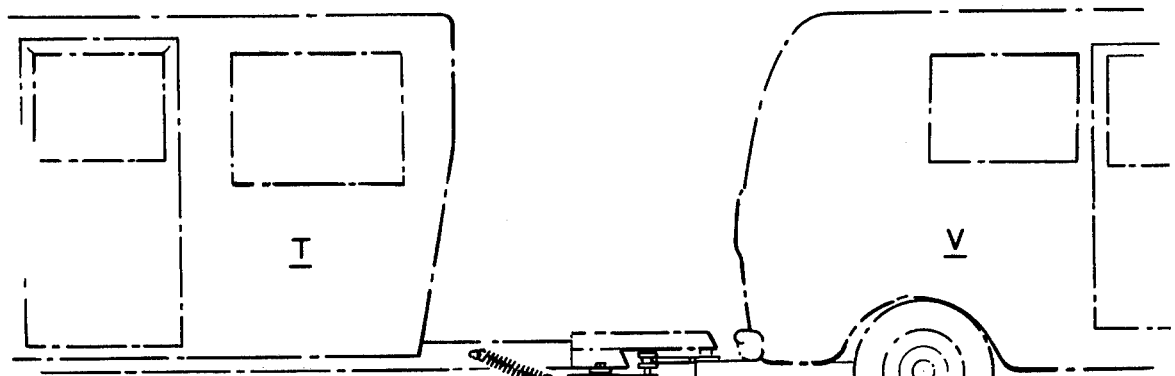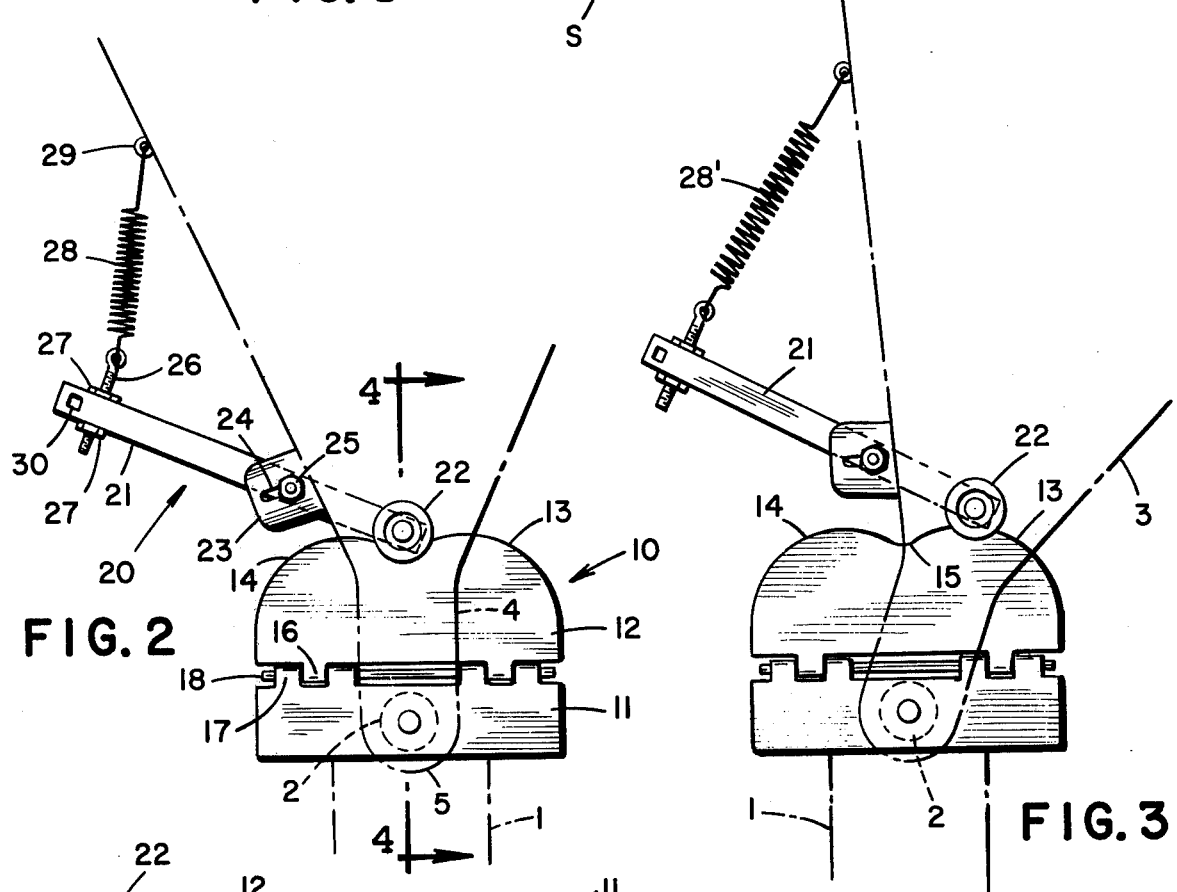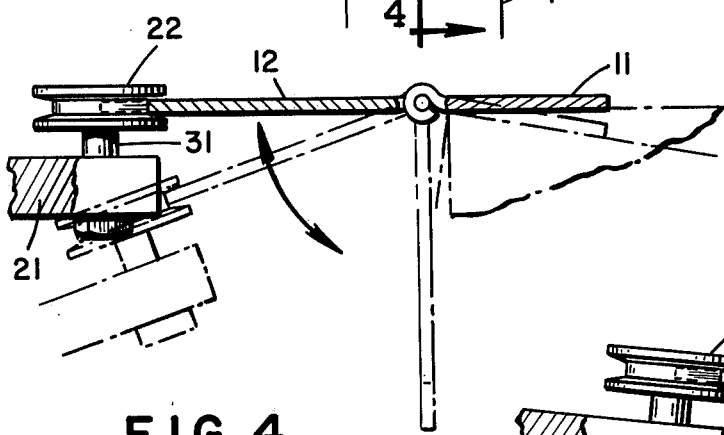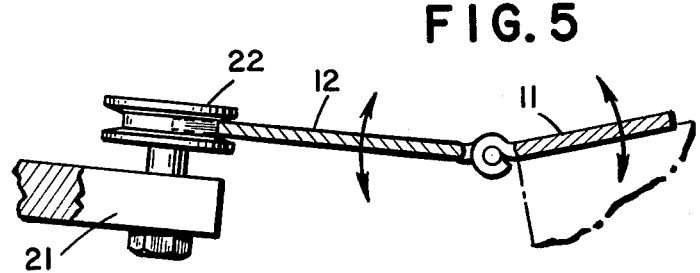

SWAY STABILIZER FOR TRAILING VEHICLES

This invention is in the field of stabilizers for a towed vehicle. More particularly, the present invention is in the field of stabilizing a trailing vehicle against sway during transport and also the invention includes a provision for preventing jack-knifing of the trailing vehicle around the towing vehicle.

BACKGROUND OF THE INVENTION AND THE PRIOR ART

The increased interest in use of trailers as a part of a recreational vehicle combination has introduced to the owners of such trailers the problem of maintaining stability of the towing vehicle as well as the towed vehicle while in transit. The problem is two-fold in that not only is the trailing vehicle occasionally found to be swaying back and forth behind the towing vehicle, "fish-tailing" as it is called, but the driver of the towing vehicle may suddenly realize that his own vehicle is being caused to sway back and forth by the action of the trailing vehicle behind it.

Generally speaking, the forces which initiate this swaying of either the trailing vehicle or the towing vehicle are external and can be encountered either from the rear or from the front. For example, when an approaching large truck or bus comes upon the towing vehicle, there is a force from the air created by the passage of the oncoming vehicle which first strikes the towing vehicle. This causes the towing vehicle to suddenly tend to sway away from the oncoming vehicle and the driver must apply proper recovery effort. Then as the oncoming vehicle passes the trailing vehicle, the driver of the towing vehicle then experiences a whipping action as a result of the trailing vehicle being pushed sideways by the force of the air due to the passage of the oncoming vehicle. In the first instance, as the driver attempts to keep the towing vehicle in a straight path, this motion back toward the center line of the side of the highway upon which the vehicle is being driven imparts a reverse directional movement to the trailing vehicle. That is, as the car is pushed to the right by the oncoming vehicle, the trailing vehicle is directed toward the left as a result of the movement of the car's rear end toward the path of the oncoming vehicle. As the driver of the towing vehicle then directs his vehicle back to the left, this imparts a motion to the trailing vehicle to go to the right. As a result of this right and then left movement of the towing vehicle and the ensuing left and then right movement of the trailing vehicle, there is imparted to the combination a sinuous or "fishtail"-like movement between the two vehicles which, if not dampened properly, can result in a development of a increasing moment of fish-tailing or deviation which can result in a serious accident.

In the second part of the application of force by the oncoming vehicle as the air pressure is directed against the trailing vehicle, this in turn causes the trailing vehicle to be directed to the right which imparts a tendency to force the towing vehicle to the left. In some instances, if the change of direction of the trailing vehicle by the action of the towing vehicle is sufficient, it is possible that the air pressure from the oncoming vehicle will cause the trailing vehicle to attempt to move more directly toward the oncoming vehicle because of the air pressure acting upon the rear part of the trailing vehicle and giving that part of the trailing vehicle a vector to the outside as well as a vector forward. In this latter instance, the moment of deviation created by this tendency of the trailing vehicle to move opposite to the direction of the towing vehicle can produce a more serious situation than occurs in the instance when the towing vehicle itself is the first one to cause the deviation.

In the situation where the towing vehicle and its trailer are being overtaken by a large, fast moving vehicle, the reverse situation occurs. The trailing vehicle is the first to feel the force of the air created by the passage of the passing overtaking vehicle and this initially can cause the rear portion of the trailing vehicle to tend to drift to the right, thus presenting a condition for the driver when he feels that his car is being pulled to the right. As the force of air then approaches the front end of the trailer, the pressure of the air from the overtaking vehicle has a tendency then to cause the rear end of the towing vehicle to also want to slide to the right, thus placing the towing vehicle in an alignment which would tend to interfere with the path of the overtaking vehicle if corrective measures were not taken such as steering the towing vehicle to the right. Then as the overtaking vehicle approaches and passes the towing vehicle, the air pressure again is directed to the towing vehicle in such a manner as to tend to cause it to drift to the right further. Attempts to correct this indicated line of direction of movement again results in the fish-tailing not only of the trailing vehicle but of the combination of the towing vehicle and the trailing vehicle.

High winds from one side of the other can also present the same type of problem to a driver of the towing vehicle because of the fact that the trailing vehicle is more or less a free object being drawn along a highway and is more subject to the lateral wind forces than is the towing vehicle. This can cause the trailing vehicle to begin to sway which sway is then imparted to the towing vehicle and the resulting fish-tailing continues.

Yet another action which can cause the fish-tailing situation to arise is when the driver of the towing vehicle is forced to make sharp turn and counter-turn to avoid an object which suddenly appears in the highway before him.

The conditions which cause the problems set forth before produce even more dangerous problems in those instances in which the trailing vehicle comprises a trailer carrying a boat or a trailer carrying an airplane, particularly sailplane. In these instances the vehicle being carried, be it boat or sailplane is merely resting so to speak in the towing trailer. The trailer itself is of a less sturdy construction than employed with the types of trailers which form living quarters, having smaller wheels and less weight.

Various devices have been developed to attempt to prevent this fish-tailing between the trailing vehicle and the towing vehicle to keep them stabilized in a more or less straight line relationship. Some devices included sets of parallel bars interconnecting the vehicles with springs attached to the bars to provide some measure of taking up the lateral movement moment of either the towing vehicle or the trailing vehicle. However, these were cumbersome and were not entirely satisfactory.

One sway control device which is commercially available utilizes a bar which interconnects the trailing vehicle with the towing vehicle. This device is commercially available by the EAZ-LIFT Spring Corporation. It consists of a first bar which is pivotally mounted adjacent the ball hitch on a towing vehicle. There is a second bar which slides over the first bar. The second bar is pivotally attached to one arm of the normal A-frame trailer hitch. By means of an adjustable braking shoe on the second bar pressure can be put on the first bar to prevent the free movement of the trailing vehicle with respect to the ball hitch of the towing vehicle. Another device to attempt to control sway between the towing vehicle and the trailing vehicle is disclosed in U.S. Pat. No. 2,940,776. This device includes a horizontal plate having an arcuate recess on the underside thereof, the plate being mounted on the A-frame trailer hitch. The underside of the plate which is in contact with the coupling device on the towing vehicle has two flat camming surfaces, one on each side of the recess which extend laterally therefrom. These camming surfaces are flat and are inclined slightly downwardly when the device is in use. The coupling device is placed in the recess and then is retained therein by a spring biased nut and bolt assembly which exerts pressure on the coupling device to force it into contact with the recess. While the coupling device will move out of the recess upon the turning of an angle between the towing vehicle and the trailing vehicle, such movement is resisted by the spring biased element.

Other devices which disclose means for centering a trailing vehicle behind a towing vehicle are found in U.S. Pat. Nos. 2,110,114 and 2,124,043. While these devices were initially developed in connection with tractors drawing field equipment such as gang plows, disk harrows and the like, the problem was again that of maintaining a straight line between the tractor and the towed equipment. The devices generally comprised a flat tongue member having a slot to provide a lost motion means and a flat cross-bar which is in the form of a U so to speak, which is attached to the towed piece of equipment. The inner surface of the flat bar of the U-shape has a recess of an arcuate form into which is fitted a rotatable disk mounted thereon on the draw bar. As the vehicle is turned the flat disk rotates thus permitting the U-shape member to move left or right with the disk coming out of the recess. If the turn is not sufficient to cause the disk to be completely removed from the recess, then the motion of the towing vehicle returning to a straight alignment with the trailing equipment causes the equipment to come into line more quickly by the pressure of the tendency of the flat disk to return to its centered position in the recess. A modification of this was to provide a spring biasing means for the flat disk and to provide a flat camming surface on each side of the central recess to further permit wider, sharper turns and at the same time assist in returning the towed equipment into straight alignment with the tractor.

In addition to stabilizing the towing vehicle and trailing vehicle to eliminate the tendency for fish-tailing, there is also a problem of jack-knifing of the trailing vehicle about the towing vehicle. This probably more often occurs when backing the trailing vehicle into a certain position, and the towing vehicle forms an angle with the trailing vehicle such that the trailing vehicle no longer moves horizontally but tends to remain fixed and pivot about one of its wheels. Jack-knifing also can occur when travelling at high speed along the highway and making a sharp turn, or when the tendency to fish-tail develops such momentum that the trailing vehicle suddenly appears to be coming up along side of the towing vehicle. Again various devices have been developed for this purpose to prevent this from happening in the use of trailers such as carrying boats or small house trailers. These frequently consisted of a series of interconnecting members such as chains or cables so that the trailer could not get too far out of alignment with the towing vehicle. These of course were cumbersome and a more simplified form may be seen in U.S. Pat. No. 3,580,612. This device comprises basically two flat plates which are pivotal in their relationship to each other. One plate contains a pair of arcuate slots on each side of the pivotal axis. The other plate contains a bolt and nut arrangement which is inserted into the slots. The slots of course limit the amount of relative pivotal movement between the two plates.

The present invention differs from the known prior art in that it utilizes the moment created by the trailing vehicle itself as it begins to deviate from its alignment with the towing vehicle. To accomplish this use is made of a cam and leverr arrangement. The cam assembly is attached to the towing vehicle and the lever arrangement is attached to the A-frame of the hitch on the trailing vehicle. The present invention provides that when the trailing vehicle is connected to the towing vehicle and the lever assembly is brought into contact with the cam assembly on the towing vehicle, the lever assembly can be placed under predetermined tension so that the moment created by the trailer's tendency to deviate from the straight line is resisted by the trailer itself and thus the tendency to fish-tail is substantially reduced if not eliminated. The present invention also provides for an adaption to this ccam and lever assembly which prevents fish-tailing. This is accomplished by means of a solenoid which activates a pin which enters a slot on the camming place, the solenoid being in turn actuated by the application of a braking pressure from the towing vehicle.

BRIEF DDESCRIPTION OF THE DRAWINGS

The present invention can be seen in an illustrative embodiment shown in the following drawing figures. Various scales have been used in the drawing figures to more properly illustrate the relationship between the respective elements as well as to more clearly present them for study.

FIG. 1 is an elevation view of a towing vehicle, a trailing vehicle and the present invention emplaced on the towing bar of the trailing vehicle;

FIG. 2 is a plan view of the present invention with the towing vehicle and the trailing vehicle in alignment;

FIG. 3 is a plan view of the present invention showing the towing vehicle making a left turn with reference to the line of direction of the trailing vehicle;

FIG. 4 is a partial section along the plane 4—4 shown in FIG. 2;

FIG. 5 is another partial section similar to FIG. 4 in which the vertical angular relationships between components of the invention is disclosed;

Figure 6:
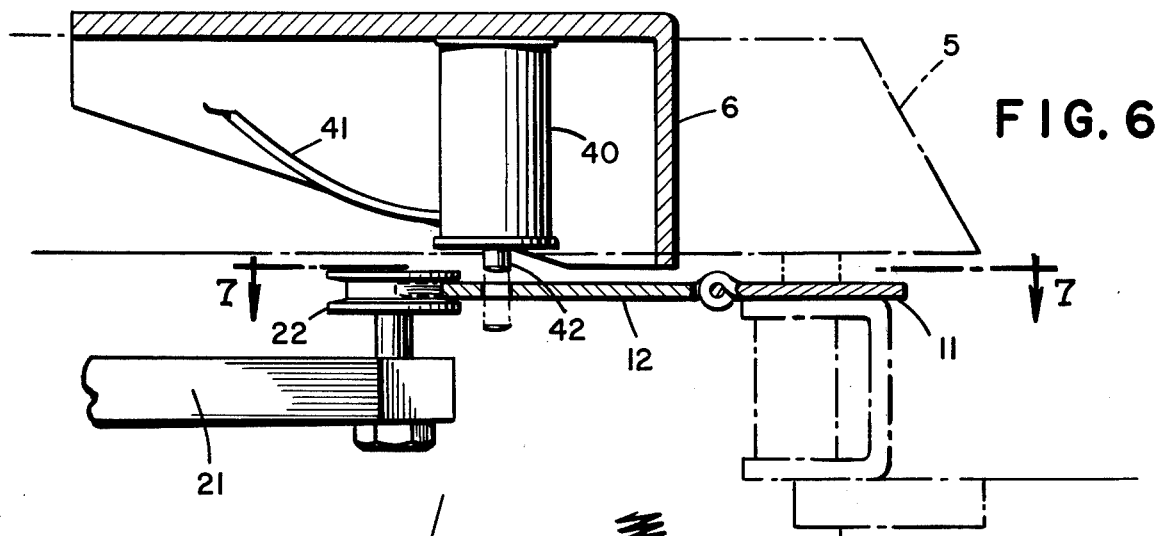
FIG. 6 is a partial section in elevation of the embodiment of the present invention encompassing the anti-jack-knifing elements.
Figure 7:
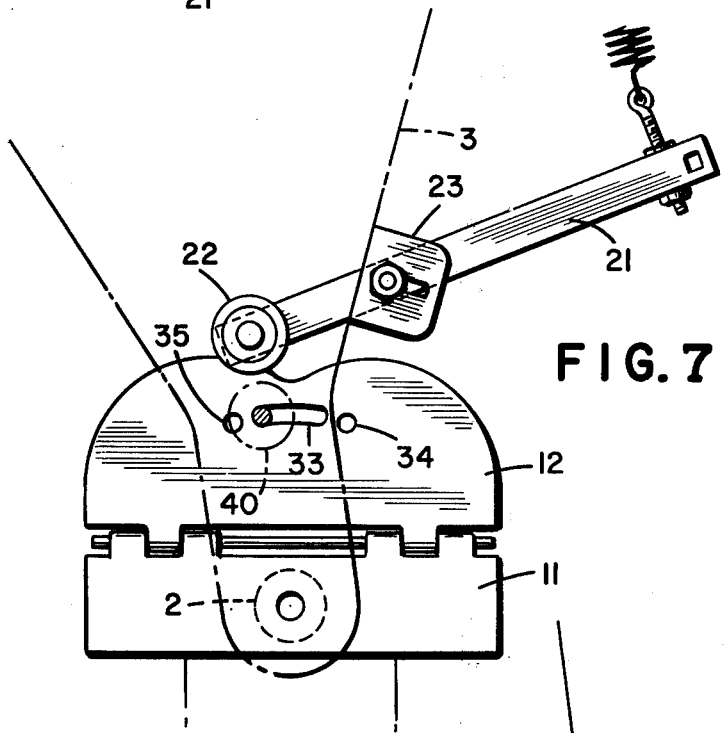
Figure 8:
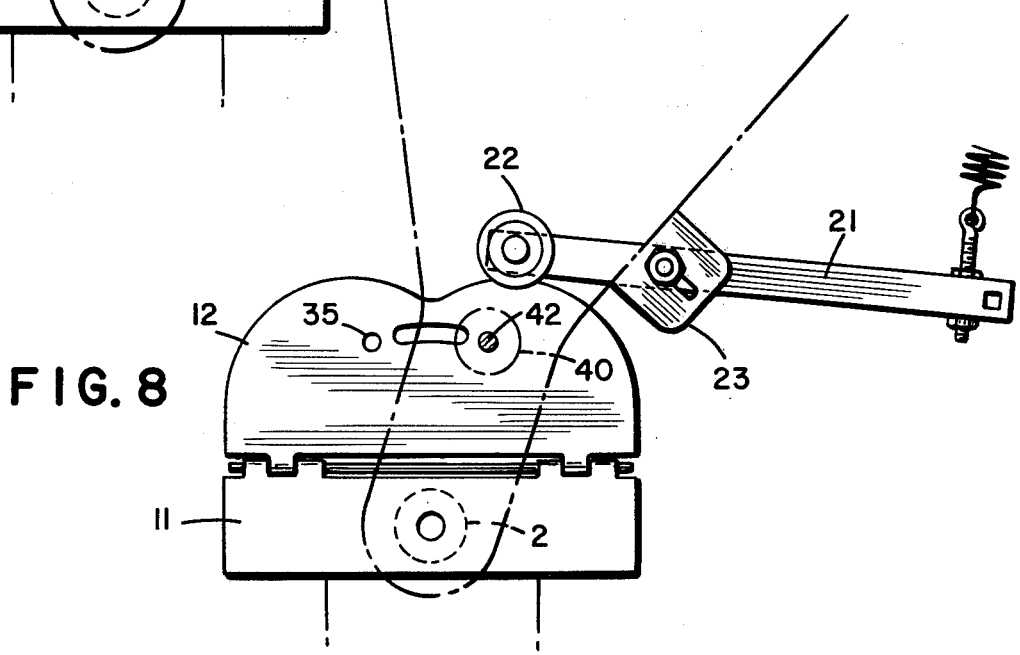

FIG. 7 is a plan view along the line plane 7—7 in FIG. 6 and shows the anti-jack-knifing device when the towing vehicle is making a right turn with reference to the trailing vehicle; and FIG. 8 is another view similar to FIG. 7 showing the anti-jack-knifing device when the towing vehicle is making a left turn with reference to the trailing vehicle and the anti-jack-knifing device is in its maximum limit position.

DETAILED DESCRIPTION OF THE DRAWINGS

FIG. 1 is a representation of the present invention when it is assembled on to a trailer hitch. The towing vehicle is indicated in phantom as V, the trailing vehicle, again in phantom, as T and the stabilizer assembly of the present invention as S. Turning now to FIG. 2 a load equalizer hitch, such as is well known in the art and not forming a part of this invention is indicated at 1. The load equalizer hitch has the conventional ball shaped hitching post indicated herein as 2. The trailing vehicle tow bar 3 is indicated in phantom. It has the tongue section 4 which includes a cover section 5 seen best in FIG. 6 which is placed over the ball hitch 2. Since the trailer tow bar is of conventional A-frame design which provides stability from the forward corners of the trailing vehicle to the hitch assembly and does not form a part of the invention, it is not shown in detail. Any form of trailing vehicle tow bar may be utilized with the present invention in so long as it includes at least one member which has an angular relationship between the right forward corner of the trailing vehicle and the tongue of the hitch.

The novel stabilizer of the present invention S is composed of two principal parts. The first is the camming assembly 10 and the second is the lever assembly 20.

The camming assembly 10 consists of a flat support plate 11 which is secured to the load equalizer hitch 1. It is placed under the ball post 2 and is secured to the load equalizer hitch in any suitable manner, for example, by welding or depending upon the design of the load equalizer hitch it can be further secured thereto by bolts. The support plate 11 provides a pair of camming surfaces 13 and 14 which are connected by an arcuate intersection 15. The camming surfaces 13 and 14 are arcuate segments, circles of equal diameter. The camming plate 12 carries hinge members 16 which mate with like numbers 17 on support plate 11 and are joined together by hinge pin 18.

Lever assembly 20 comprises a lever 21 generally of rectangular cross-section. Lever 21 carries a pivotal roller 22 at one end and the lever is attached to the trailing vehicle hitch by a plate 23 which is relative thereto. Plate 23 carries a slot 24 into which is inserted a bolt and nut assembly 25 to provide a sliding pivot for the lever. The end of the lever 21 opposite that end carrying the roller 22 has an eye bolt 26 which can be adjustably positioned in the end of the lever 21 by means of securing nuts 27. The eye bolt carries one end of a coil tension spring, the other end of which is secured to the trailer hitch by an eye 29 which may be welded to that member or may comprise an eye bolt with a shorter shank. An opening 30 is provided through bar 21 for use with a torque wrench as will be described later.

Referring to FIG. 6 there is shown elements which provide the anti-jack-knifing aspect of the present invention. A solenoid 40 is mounted on the underside of a triangularly shaped cover 6 which is positioned within the apex of the trailer hitch over the camming plate 12 of the cam assembly 10. The solenoid 40 is shown as connected to the trailing vehicle electrical braking system which is normally found on most trailing vehicles of the recreational type by a cable 41. From the solenoid 40 there can be ejected a pin 42 which is insertable into slot 43 as seen in camming plate 12 in FIG. 7 or in the separate apertures 44 and 45, one on each side of the slot 43 in camming plate 12. The slot 43 is of a length such as will permit normal change in the alignment of trailing vehicle with the towing vehicle when making turns around corners and conventional curves. The separate apertures 44 and 45 provide the limits to which the trailing vehicle should be permitted to deviate from its alignment with the towing vehicle from the standpoint of preventing jack-knifing.

The hinged camming assembly 10 has an advantage over other stabilizers in that as seen in FIG. 4 the support plate 11 may remain in a horizontal position and the camming plate 12 may be depressed as in an instance when the trailing vehicle is at an vertical angle with reference to the towing vehicle. When the trailing vehicle is unhitched from the towing vehicle it will be seen that the camming plate 12 will hang down vertically on the load equalizer hitch. In FIG. 5 it will be seen that the hinged arrangement of the cam assembly will permit the vehicles to change their plane of reference horizontally in going over bumps or through depressions. These changes in the relative horizontal relationship between trailing vehicle and towing vehicle in no way affects the operation of the stabilizer aspect of the present invention or the anti-jack-knifing invention.

The following steps are taken in preparing the stabilizer for use. The trailing vehicle is attached to the towing vehicle, the roller 22 is inserted on the camming plate and the spring 28 is connected to the eye 29 and the eye bolt 26. A torque wrench is then inserted in the recess 30 and the handle of the torque wrench is extended along the axis of the bar 21. Adjusting nuts 27 are then loosened to this extent. The upper securing nut is turned up toward the eye of the eye bolt 26. The lower securing nut is then tightened until the spring 28 is taut but without any tension placed on it. Pressure is then applied to the handle of the torque wrench which causes the bar 21 to pivot about the bolt 25. This will lift roller 22 from the camming plate. Pressure is continually applied to the handle of the torque wrench until the bar on the torque wrench indicates a torque of predetermined amount. For example, for a trailer weighing approximately 4500 pounds a torque of 70 foot pounds on the tension spring has been found to be adequate. As can be seen in the drawings the distance between the tension spring and its pivot point 25 is a multiple of the distance between the pivot point 25 and the roller 22. The torque of 70 foot pounds on the tension spring has a torque effect on the roller equal to the multiple of the ratio of the distance between the torsion spring and its pivot point 25 and the pivot point 25 and the roller 22. The lower securing nut is then turned up until when the pressure on the torque handle is released the spring 28 is distended to provide the same torque as indicated on the dial. The upper securing nut is then turned down to the handle to hold the eye bolt securely in place.

FIG. 3 illustrates the manner in which the components cooperate to resist the change of alignment of the trailing vehicle and the towing vehicle. Beginning with the alignment of the two vehicles as shown in FIG. 2, as the towing vehicle turns to the left or conversely as the trailing vehicle is forced to the left the roller 22 begins to climb out of the arcuate recess 15. This movement is resisted by the force on the tension spring 26. Additionally the arm 21 will begin to move slightly about its pivot bolt 25 through slot 24. Since the roller is leaving the arcuate recess 15 and beginning to move toward the trailing vehicle along the cam surface of cam 13 this movement is resisted in part by the tension spring 26' as shown in FIG. 3. The slot 23 permits the roller 22 to move from the arcuate recess 15 without imparting undue pressure on the cam plate 13. Even so the movement of the roller 22 from the recess 15 along the arcuate surface of cam 13 applies an additional amount of torque to the lever 21 to attempt to resist this movement out of the recess. The torque which is thus created tends to always resist the movement of the trailing vehicle from the straight alignment with the towing vehicle. In addition to preventing the fish-tailing of the trailing vehicle, the torque created by the novel stabilizer of the present invention also improves the following of the trailing vehicle when the towing vehicle is making a turn such as around a street corner and the like. The trailing vehicle develops a tendency to come back into continued straight alignment with the towing vehicle and thus follows the path of towing vehicle more closely than when without the stabilizer.

As shown in FIG. 4 it is evident that the hinge arrangement of the novel stabilizer of the present invention permits the trailing vehicle and towing vehicle to assume different attitudes in a vertical plane with respect to each other without any loss of stabilizing effect.

The anti-jack-knifing embodiment with the present invention operates in the following fashion. Under the standard driving conditions along a highway, the pin 42 is retracted within the solenoid 40. The stabilizer element acts to maintain the alignment of the trailing vehicle with the towing vehicle. Should it be necessary to control the tendency of the vehicle to fish-tail excessively due to a sudden de-acceleration of the towing vehicle, the application of the brake to the towing vehicle will activate the braking system on the trailing vehicle. This will in turn cause the solenoid to release the pin 42 which then falls normally into slot 43. This permits the alignment of the towing vehicle and trailing vehicle to be varied from a straight line configuration through one in which the vehicles are at a slight angular relationship to each other such as for example when it is necessary to pull off the road. The slot 43 is of a length such that there is maneuverability as far as changing the direction of movement of the trailing vehicle and yet there is control over such movement so that the trailing vehicle will not turn at too great an angle relative to the towing vehicle. The openings 44 and 45 represent the general limits of angular displacement of the trailing vehicle from the towing vehicle without losing control over the trailing vehicle. When pin 42 falls into either of these openings the relationship between the trailing vehicle and the towing vehicle is fixed for so long as the solenoid has been activated.

While the operation of the anti-jack-knifing embodiment has been described with reference to the operation of it by the electrical braking system on the trailing vehicle, other means of activating the solenoid may be utilized. For example, if the trailing vehicle is equipped with a hydraulic or fluid brake system, the solenoid could be replaced with an air cylinder or fluid cylinder which would be activated by the application of brakes to the trailing vehicle and would cause the pin to move forward in the same manner as with the solenoid. The anti-jack-knifing device could also be activated by a sensing means which would operate the pin in an instance when the tire on the trailing vehicle suddenly lost its air pressure and caused the trailer to tilt or begin to sway. Means which would detect the relative change in speed of rotation of one of the wheels on one side of the trailing vehicle relative to the other could also be utilized to activate the anti-jack-knifing embodiment as an addition to the normal method of operation due to the braking of the trailing vehicle.

It will be understood that various changes in the details, materials and relationship of parts which have been herein described and illustrated in order to explain the nature of this invention, may be made by those of skill in the art within the principal and scope of the invention as expressed in the following claims. For example, the tension spring 26 could be replaced by a fluid activated cylinder which has a capability of being adjusted as to the force to be applied by the fluid cylinder, somewhat along the lines of the adjustable shock absorbing.

It will be further understood that the "Abstract of the Disclosure" set forth above is intended to provide a non-legal statement of the contents of the disclosure in compliance with the Rules of Practice of the U.S. Patent and Trademark Office, and is not intended to limit the scope of the invention described and claimed herein.

What is claimed is:

1. A device to stabilize the alignment between a towing vehicle and a trailing vehicle comprising a camming assembly mounted on the hitch element of the towing vehicle, one portion of said assembly being adapted for pivotal movement in a vertical plane relative to the remainder of said assembly, and a pretensioned lever assembly pivotally mounted on the tongue of the trailing vehicle with one end thereof engaging said pivotal portion of said camming assembly.

2. A device for stabilizing the alignment between a towing vehicle and a trailing vehicle comprising a camming assembly attached to a hitch element of the towing vehicle, the camming assembly comprising a support plate fixedly secured to said hitch element underneath the hitch ball, a camming plate pivotally connected to said support plate and having two camming edges connected by an arcuate recess, and a pretensioned lever assembly pivotally connected to a tongue of the trailing vehicle, the lever assembly comprising means connecting one arm of the tongue of the trailing vehicle and one end of the lever assembly which means can be placed under tension, and a roller pivotally mounted at the other end of said lever assembly, said lever assembly having a mounting plate secured to said element of the tongue, a pivot pin in said lever passing through said mounting plate on said tongue, said roller engaging said arcuate recess in said camming plate.

3. The device according to claim 2, wherein said camming plate is hingedly connected to said support plate for movement in a vertical plane relative to said support plate.

4. The device according to claim 3, wherein said camming surfaces comprise arcuate segments of circles of equal diameter.

5. The device according to claim 2, wherein said tensioning means comprises means on said element of said trailer tongue to receive and retain one end of said tensioning means, said lever having adjustable means passing through said one end thereof to receive and retain the opposite end of said tensioning means.

6. The device according to claim 1, further comprising a plurality of openings in said camming plate, means on said tongue to inject an element into one of said openings in said camming plate upon signal, and signal means to activate said means for injection of said element.

7. The device according to claim 6, wherein said signal means comprise a braking means for said trailing vehicle.

8. The device according to claim 7, wherein said signal means comprise a braking means of said towing vehicle.

9. The device according to claim 6, wherein one of said openings comprises an arcuate slot centrally located in said camming support plate, said other openings comprising single apertures spaced from said slot on each side thereof and on the same arcuate axis thereof.

10. A device for stabilizing the alignment between a towing vehicle and a trailing vehicle comprising a camming assembly fixedly mounted on the hitch of the towing vehicle, a portion of said assembly being adapted for pivotal movement in a vertical plane relative to the remainder of said assembly, a pretensioned lever assembly pivotally mounted on the tongue of said trailing vehicle and engaging the pivotal portion of said camming assembly and an element mounted on said tongue and having therein means which can be ejected therefrom, a plurality of openings in said pivotal portion of said camming assembly to receive said ejectable means and means to activate said element having the ejectable means.

11. The device according to claim 10, wherein said pivotal portion comprises a camming plate and said remaining portion comprises a support plate and said camming plate is hingedly connected to said support plate for movement in a vertical plane relative to said support plate.

12. The device according to claim 11 wherein said camming plate has two camming surfaces and said camming surfaces comprise arcuate segments of circles of equal diameter.

13. The device according to claim 10, wherein said tensioning means comprises means on said element of said trailer tongue to receive and retain one end of said tensioning means, said lever having adjustable means passing through said one end thereof to receive and retain the opposite end of said tensioning means.

14. The device according to claim 10, wherein said signal means comprise a braking means for said trailing vehicle.

15. The device according to claim 10, wherein said signal means comprise a braking means of said towing vehicle.

* * * * *